United States Patent [19]

Hunter et al.

[11] 4,130,487
[45] Dec. 19, 1978

[54] FILTERS FOR LIQUIDS OR GASES

[75] Inventors: George S. Hunter; Susanne P. Hunter, both of Houghton-le-Spring; Brian Walker, Washington, all of England

[73] Assignee: Process Scientific Innovations Ltd., Durham, England

[21] Appl. No.: 784,320

[22] Filed: Apr. 4, 1977

[30] Foreign Application Priority Data

Apr. 5, 1976 [GB] United Kingdom ............... 13640/76
Nov. 11, 1976 [GB] United Kingdom ............... 46969/76
Mar. 8, 1977 [GB] United Kingdom ............... 9680/77

[51] Int. Cl.² ........................ B01D 53/02; B01D 46/02
[52] U.S. Cl. ........................................ 210/85; 55/274;
55/316; 55/350; 55/521; 210/259; 210/489;
210/502; 210/508
[58] Field of Search ................. 55/274, 316, 350, 486,
55/521, 522, 527, 315; 210/489, 490, 491, 502,
508, 509, 85, 259

[56] References Cited

U.S. PATENT DOCUMENTS

| 2,038,071 | 4/1936 | Wilheim | 55/316 X |
|---|---|---|---|
| 2,826,265 | 3/1958 | Woody | 55/486 X |
| 3,019,127 | 1/1962 | Czerwonka et al. | 55/316 X |
| 3,252,270 | 5/1966 | Pall et al. | 55/316 X |
| 3,594,993 | 7/1971 | Herse | 210/509 X |
| 3,793,041 | 2/1974 | Sowman | 210/509 X |
| 3,891,417 | 6/1975 | Wade | 55/274 |
| 4,033,881 | 7/1977 | Pall | 210/493 B |

Primary Examiner—John Adee
Attorney, Agent, or Firm—Pollock, VandeSande & Priddy

[57] ABSTRACT

Filter elements are described in which a pleated cylindrical sheet of non-woven microporous glass fibre filter material impregnated with a binder, which may be silicone, polyurethane, phenolic resin or epoxy resin, is mounted in contact with a cylindrical supporting sheet of, for example, expanded metal for maintaining the filter material against shock pressure loads. To protect the filter material during assembly a porous layer of protective material may be interposed between the filter material and the supporting cylinder. The supporting cylinder may be a simple cylinder or pleated so as to fit the filter material. An activated carbon layer for removing odors during air filtration may be added to the filter material. When the air contains oil mist, a layer containing dye that will be taken up by the oil and discolor the filter element as a warning indication that the filter has become saturated, may be interposed between the filter material and the activated carbon layer. The filter material may comprise an organic binder holding together borosilicate glass fibres, this amorphous mass being further impregnated by a synthetic resin binder. The filter material may consist of a glass fibre filter paper with a further layer of non-woven material secured thereto by a synthetic resin binder.

9 Claims, 6 Drawing Figures

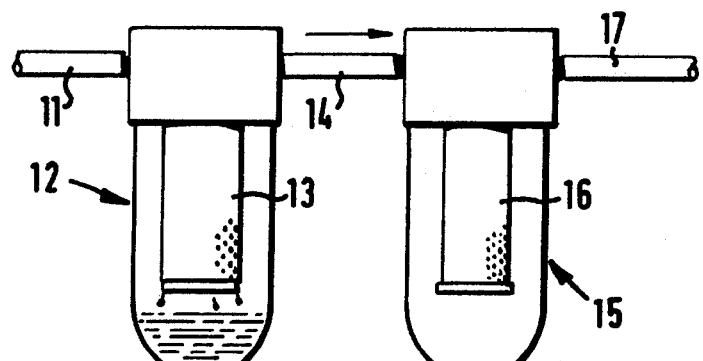
FIG. 3
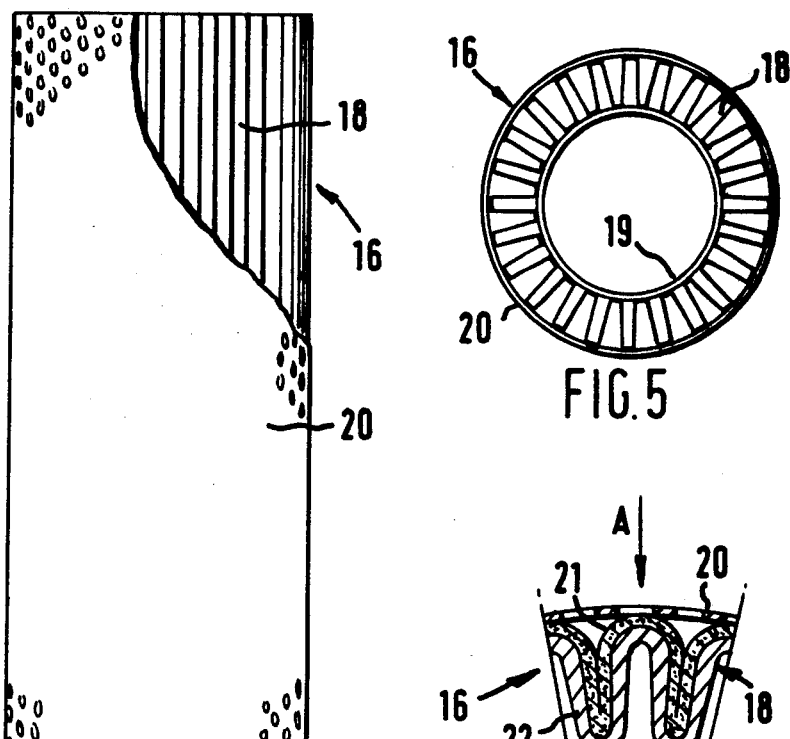
FIG. 4
FIG. 5
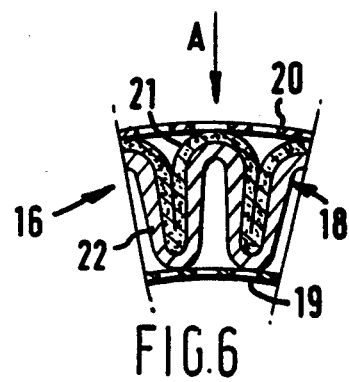
FIG. 6

FILTERS FOR LIQUIDS OR GASES

This invention relates to filters for gas or liquid wherein a high efficiency filter medium is used. Such a filter medium is glass fibre paper. This is a very high efficiency medium which, when tested to B.S. 3928 (sodium flame test), will be substantially 100% efficient. D.O.P. tests with 0.3 micron particles would give similar results.

A filter element when made from at least one layer of glass fibre paper, even when pleated, is weak when subjected to shock pressure loads, assuming that an excess of bonding agent for the fibres, which would impair the filtering properties of the medium, is avoided. One object of the present invention is to provide a filter having an adequately supported high efficiency filter medium.

According to the present invention, a filter element for fluids comprises at least one cylindrical pleated sheet of non-woven microporous fibrous material impregnated with a binder carried against a perforate supporting cylinder so that the filter material is retained against the cylinder when subjected to pressure. Where one supporting cylinder is used this is located so as to give maximum support to the filter sheet having regard to the direction of flow, i.e. from inside to outside or outside to inside of the cylinder. Alternatively, of course, the cylindrical sheet of pleated filtering material may be located between two comparatively stiff supporting cylinders to provide a very strong structure. The microporous non-woven material may be borosilicate glass fibre held together with an organic binder, the glass fibres having 0.1 to 0.9 microns (inclusive) mean diameter and a length of between 1 and 2 mm (inclusive) and containing coarse fibres of up to 6 mm length and the glass material being impregnated by a synthetic resin binder to enable it to withstand shock pressure loads.

For larger sizes of filter element, an apertured cylinder of stiff material may be pleated so as precisely to fit the pleated filter sheet or sheets in overall contact with the filter sheet or one of the filter sheets. Alternatively the apertured cylinder may be a simple cylinder. The stiff material may very conveniently be expanded metal or metal gauze.

The microprous filter material may consist of fibre filter paper bonded to a non-woven filter material which may be roughly classified as paper by means of a binder and comprises ceramic fibre, metal fibre, asbestos, mineral wool, organic fibre, further glass fibre or a membrane.

While the aforesaid filter elements can be made exceptionally efficient in their capacity to remove contaminating suspensions such as dust, dirt, oil or water droplets or vapour from an air stream, in some cases it is highly desirable also to remove odours, that can find their way through the filter element. A further object of the present invention is, therefore, to provide for effective odour removal.

Therefore, at least one activated carbon layer may be included in the pleated wall of the filter element.

Alternatively at least one activated carbon layer may be included in a filter element having a pleated wall which may or may not be formed in accordance with the invention but is mounted in series with such a filter element. In this case, the pleated wall of the filter element may comprise two layers, namely a layer containing activated carbon immediately adjacent to a layer of filter paper. However, more than one such layer may be used; for example, two layers containing activated carbon immediately adjacent to a layer of filter paper.

In order that the invention may be clearly understood and readily carried into effect filter elements and filters in accordance therewith will now be described, by way of example, with reference to the accompanying drawings, in which:

FIG. 3 is a diagrammatic side elevation of the filter assembly;

FIG. 4 is a side elevation of a filter element with an outer cylinder of stiff material shown partially removed;

FIG. 5 is an end elevation of the filter element of FIG. 4; and

FIG. 6 shows a cross-section, on an enlarged scale, of a portion of a filter element similar to that of FIGS. 4 and 5.

Figure 1:
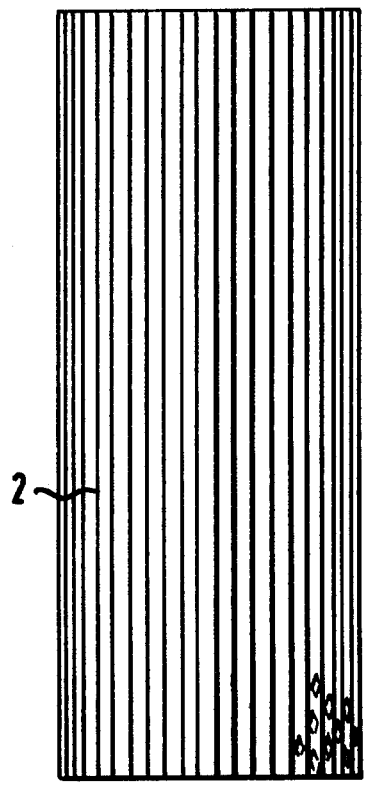
FIG. 1 is a side elevation of a filter element.
Figure 2:
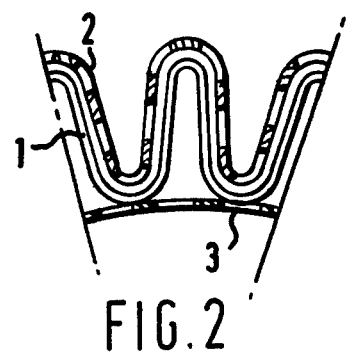
FIG. 2 is a cross-section on an enlarged portion of the filter element of FIG. 1.

Referring to FIGS. 1 and 2, the filter element of this example comprises two pleated sheets 1 of laminated filter media including glass fibre paper reinforced externally by a pleated sheet 2 of expanded metal that exactly fits the layers of glass fibre paper. An inner simple support cylinder 3 of expanded metal bears on the peaks of the filter sheets 1.

The thickness of the filter sheets 1 according to the number of sheets may be between 40 thousandths of an inch and half an inch according to the size of the filter. The fibre diameters may vary between 0.1 and 20 microns according to the minimum size of particle that has to be separated from the fluid.

The composite filter element is impregnated and bonded with a phenolic, silicone, or other synthetic resin that will withstand water, mineral, vegetable and synthetic oils, acids, alkalis and such contaminants as are usually found in air, compressed air, vapours and gases.

The filter sheet 1 or each filter sheet, comprises laminated filter media consisting of a glass fibre filter paper bonded to a non-woven or woven filter material, which may be roughly classified as paper, by means of a plastics material such as polythene or polypropylene or other suitable synthetic resin, which may, for example, be thermosetting or cold curing by the addition of a liquid chemical or heat setting.

The laminated filter material, may be formed by first spraying the non-woven or woven material filter medium with a thermoplastic material. The paper thus treated is then brought into contact with the glass fibre paper under pressure and heat, so that the thermoplastic material melts and forms a bond on curing. Then this material is pleated and formed into a cylinder, but this may be done subsequently to the addition of another layer of non-laminated filter medium which is bonded by thermoplastic material or other synthetic resin dispersed in a suitable solvent to the laminated filter media, thus forming two layers in which the bonding material gives the fibrous material some structural rigidity. The pleated paper sheet is then located in the pleated apertured sheet 2 of expanded metal. The composite pleated element may also be supported on its internal peaks by a simple cylinder of expanded metal. Finally as is usual with pleated filters, the ends of the element are dip sealed into end caps by means of a synthetic resin or other sealing medium that penetrates through the edge regions of the filter element and prevents leakage of the fluid round these edges. This synthetic resin may advantageously be of the kind that can be moulded while being applied to the filter element to form a ring or cap having the properties of a gasket. These end caps are, of course, for the purpose of ensuring the passage of the fluid through the filter material when the element is mounted in a filter housing.

In a modification of the aforesaid filter element, applicable to smaller elements, for example two inches diameter and two to three inches high, the pleated apertured sheet 2 of expanded metal, is replaced by a simple cylinder of such material that merely touches the external or the internal peaks of the pleated medium. Alternatively two such simple cylinders touching the external and internal peaks may be provided.

An advantage of the aforesaid laminated media including glass fibre filter paper is that it gives the media more inherent strength in the direction of flow through the media. This means that less synthetic plastics material can be used to reinforce the filter media, thus allowing a greater flow of air, or other fluid to be filtered, for a smaller pressure drop across the filter. Moreover, the filter element containing the laminated media can withstand higher shock pressures and higher pressure drops across the filter as the filter becomes blocked with particulate matter during use.

An example of a filter element having the cylindrical pleated laminated media between simple cylinders of expanded metal has substantially the following dimensions: overall outside diameter 4.4 cms, length 6.0 cms, distance between outside peaks 0.4 cms, radial distance between the inside and outside cylinders 0.6 cms.

The assembly of FIG. 3 comprises a delivery pipe 11 for supplying compressed air to a primary filter 12 containing a filter element 13 constructed according to the invention. This filter removes any oil or water mist or dirt from the air stream which then flows through a pipe 14 to a secondary filter 15 containing a filter element 16 as shown in FIGS. 4 to 6. After passing through the filter element 16, the cleaned air is discharged through a pipe 17.

The filter element 16 comprises a pleated layer 18 of activated carbon and paper filter media supported beteen internal and external cylinders 19, 20 of expanded metal. The ends of the filter elements 13, 16 are sealed to end caps, the upper one with a central aperture, as is usual in the case of pleated, cylindrical filter elements.

As shown by the arrow A in FIG. 6, the air to be cleaned flows from outside to inside the filter element 16 so that the activated carbon layer 21 is outside the layer 22 of filter paper. For flow in the opposite direction, the carbon would be inside.

The activated carbon layer may be approximately 1 mm thick with an activated carbon content of 50% by weight, the balance being made up by fibres. Such material is obtainable from C. H. Dexter and Sons Company of Windsor Locks, Conn., U.S.A. An alternative is a charcoal cloth manufactured by the Chemical Defence Establishment, Porton Down, Salisbury, Wiltshire. This is a strong highly absorbent charcoal, the activity of which can be varied to suit varying requirements. The activated carbon layer 21 removes, for example, hydrocarbon gas from the air by adsorption, and any particulate matter, shed from the activated carbon layer, is removed by the downstream adjacent filter layer 22 which is at least 96% efficient against 0.3 micron particles.

The paper filter layer 22 may be constituted by a sheet as aforesaid of laminated filter media consisting of a glass fibre filter paper bonded to a non-woven or woven filter material that may be roughly classified as paper. In this and in the other examples described above, the woven or non-woven filter material that may be roughly classified as paper may comprise ceramic fibre, metal fibre, asbestos, mineral wool, organic fibre or further glass fibre, or even a membrane. In fact, where a pleated supporting sheet of perforate stiff material is used, any of these materials can be used in a single or multiple sheet. The pleated support sheet enables these materials to withstand shock pressure loads even although they are weak, assuming that an excess of bonding for binding the fibres together is avoided. Such an excess would impair the filtering properties of the medium.

The apertured pleated sheet which, as an alternative to expanded metal may be of gauze or of a stiff nonmetallic material, is shown in FIG. 2 as fitted outside the pleated layer or layers of filter medium. However, in some cases, the filter needs higher mechanical strength in the main direction of flow than in the reverse direction. Thus, where the fluid to be filtered passes from outside the cylinder to the inside, the support layer is preferably on the inside. However, in an alternative arrangements, two or three layers of filter medium are added to the corrugated inside or outside surface of the pleated cylinder, over the support sheet.

Very advantageously, further to impart high mechanical strength to prevent rupture of the fragile filter medium when subjected to shock pressure loads, the filter element, comprising the composite pleated filter medium and support, is resin reinforced. This may be done by forcing a liquid carrier of a phenolic or silicone resin for example, into the medium, but only to such an extent as substantially to avoid impairing the filter qualities of the medium. The force may be generated by a centrifuge, a vacuum technique or compression technique. Alternative the filter element can simply be immersed for a period in a resin solution. To hold the filter medium in place during this process and during operation, a simple cylinder of perforated support material may be added so as to touch only the peaks of the pleated filter medium on the opposite face to the pleated support sheet. After the impregnation the filter is put into an oven so as to cure the resin at the requisite temperature. Alternatively the medium may be impregnated prior to placing with a resin that subsequently cures with heat.

A further example of the invention comprises one or more cylindrical pleated sheets consisting of microporous non-woven borosilicate glass fibres, the fibres being held together with an organic binder, the glass fibres having 0.5 to 9.0 microns (inclusive) mean diameter and a length of between 1 and 2 mm (inclusive) and coarse fibres up to 6 mm length, and the borosilicate glass material being further impregnated by a synthetic resin binder to enable it to withstand shock pressure loads when mounted between two simple perforate metal supporting cylinders. The synthetic resin binder is preferably silicone but alternative materials such as polyurethane, phenolic resin or epoxy resin may be used.

In assembling the filter elements described above wherein an internal and an external, or both an internal and external, simple cylinder of perforate supporting material is used, it is sometimes desirable to interpose a cylindrical layer of protective material between the pleated filter sheet and the cylinder, or each cylinder, the protective material being such as to protect the pleated filter material during assembly.

The layer, or each layer, of protective material must be sufficiently porous to permit the passage through it of the gas or liquid being filtered. Non-woven nylon has been found to be particularly suitable but non-woven polyester, rayon or acrylic materials can be used as alternatives as also can woven materials such as woven glass fibre.

In such as example, each layer in the filter material may advantageously be 0.73 mm thick and the basic fibre may be manufactured from pure borosilicate glass micro fibre of 0.5 micron mean diameter. The pleats are preferably packed quite closely together.

As in the examples previously described, the filter element may be bonded into end caps as is usual with pleated cylindrical filter elements.

Very advantageously means are provided for providing warning indication when a filter element is saturated with oil, in particular a filter with a layer of carbon material as shown in FIG. 6. This may be achieved by applying a layer containing an oil soluble dye which changes the colour of the filter element to red in the presence of oil. This may be applied in the form of chips or granules or may consist of a mixture of oil soluble wax and dye stiff. The dye stuff may be that known under the Registered Trade Mark "Waxoline Red O.S." manufactured by I.C.I. Ltd.

In the case of a filter element such as that of FIG. 6, the dye may be retained between the activated carbon layer 21 and the layer 22 of filter paper by dipping, prior to assembly of the filter element, the inner cylinder 22 into a molten wax containing dye dispersed in it but leaving the inner cylinder porous. The dye turns oil passing through the filter element to a reddened colour which appears on the outside of the filter element as a warning.

In a further example the dye is dissolved in a solvent such as trichloroethylene or toluene and one layer of the filter material can be impregnated with this. The layer can be the aforesaid activated carbon layer or a third layer may be impregnated with the solution and located between the activated carbon layer and the sheet of non-woven microporous fibrous material impregnated with a binder.

We claim:

1. A filter element for fluids comprising at least one cylindrical sheet of nonwoven microporous fibrous filter material impregnated with a synthetic resin binder, said filter material consisting of an amorphous mass of borosilicate glass fibers, a substantial quantity of said borosilicate glass fibers each having a diameter of between 0.5 to 9.0 microns and a length of between 1 and 2 mm, the remaining fibers having a length of up to 6 mm, said sheet being at least about 0.03 inches thick and formed with pleats over its entire area, said pleats being substantially parallel to the axis of said cylindrical sheet and presenting peaks internally and externally of said cylindrical sheet, the internal peaks being spaced from the external peaks by approximately 0.6 cm, and at least one perforate supporting cylinder of comparatively rigid material formed with perforations substantially over its whole area, said supporting cylinder being mounted closely adjacent to said cylindrical sheet to provide support for said sheet, said synthetic resin binder providing support for said borosilicate microporous fibrous material between said peaks.

2. A filter according to claim 1, in which two of said supporting cylinders are provided respectively adjacent the inside and outside of said cylindrical sheet.

3. A filter according to claim 1 in which said binder is silicone.

4. A filter according to claim 3 in which said impregnated filter material consists of borosilicate microporous material that has been impregnated with silicone prior to pleating and subsequently cured.

5. A filter according to claim 1 wherein said sheet of nonwoven borosilicate microfibrous filter material impregnated with a synthetic resin binder is bonded to a layer of porous paper.

6. A filter element according to claim 1 including a separate pleated layer of activated carbon covering one face of said pleated cylindrical sheet.

7. A filter element according to claim 6 including a further layer of material containing dye adapted to be taken up by oil when a gas containing oil mist is passed through the filter element, said further layer being interposed between said pleated cylindrical sheet and said pleated layer of activated carbon, whereby oil entering the filter element through said layer of activated carbon has its color changed on reaching said dye ultimately resulting in a color change of the outer surface of said filter element.

8. A filter element according to claim 2 including two layers of protective material pervious to the fluid being filtered and adapted to protect said pleated filter sheet during its assembly with said protective supporting cylinders, said layers of protective material being respectively interposed between said pleated filter sheet and said protective supporting cylinders.

9. A filter assembly comprising first and second filter elements and conduit means for passing a fluid to be filtered in succession through said filter elements; said first filter element comprising at least one cylindrical sheet of nonwoven microporous fibrous filter material impregnated with a synthetic resin binder, said filter material consisting of an amorphous mass of borosilicate glass fibers, a substantial quantity of said borosilicate glass fibers each having a diameter of between 0.5 to 9.0 microns and a length of between 1 and 2 mm, the remaining fibers having a length of up to 6 mm, said sheet being at least about 0.03 inches thick and formed with pleats over it entire area, said pleats being substantially parallel to the axis of said cylindrical sheet and presenting peaks internally and externally of said cylindrical sheet, the internal peaks being spaced from the external peaks by approximately 0.6 cm, and at least one perforate supporting cylinder of comparatively rigid material formed with perforations substantially over its whole area, said supporting cylinder being mounted closely adjacent to said cylindrical sheet to provide support for said sheet, said synthetic resin binder providing support for said borosilicate microporous fibrous material between said peaks; and said second filter element comprising a cylindrical sheet of pleated filter paper coated with a layer of activated carbon.

* * * * *